(12) United States Patent
Eischeid et al.

(10) Patent No.: US 7,376,469 B2
(45) Date of Patent: May 20, 2008

(54) METHODS AND APPARATUS FOR IMPLEMENTING MANUAL AND HYBRID CONTROL MODES IN AUTOMATED GRAPHICAL INDICATORS AND CONTROLS

(75) Inventors: Todd M. Eischeid, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 11/106,914

(22) Filed: Apr. 15, 2005

(65) Prior Publication Data

US 2006/0236248 A1 Oct. 19, 2006

(51) Int. Cl.
- G05B 11/01 (2006.01)
- G06F 3/048 (2006.01)
- G06F 3/033 (2006.01)
- G09G 5/00 (2006.01)

(52) U.S. Cl. ............... 700/17; 715/833; 345/184
(58) Field of Classification Search ........... 345/156, 345/173, 184; 715/700, 833, 866; 700/17, 700/18, 83
See application file for complete search history.

(56) References Cited

U.S. PATENT DOCUMENTS

| | | | |
|---|---|---|---|
| 5,477,241 A | 12/1995 | Higgins et al. | 345/127 |
| 5,491,782 A | 2/1996 | King et al. | 395/159 |
| 5,615,347 A | 3/1997 | Davis et al. | 395/349 |
| 5,682,488 A | 10/1997 | Gleason et al. | 395/348 |
| 6,012,044 A * | 1/2000 | Maggioncalda et al. | 705/36 R |
| 6,080,925 A * | 6/2000 | Rogers et al. | 84/485 R |
| 6,384,591 B1 * | 5/2002 | Estep et al. | 324/111 |
| 6,542,171 B1 * | 4/2003 | Satou et al. | 715/833 |
| 6,708,176 B2 * | 3/2004 | Strunk et al. | 707/10 |
| 6,750,889 B1 | 6/2004 | Livingston | 345/833 |
| 6,822,634 B1 * | 11/2004 | Kemp et al. | 345/156 |
| 7,134,994 B2 * | 11/2006 | Alpert et al. | 600/300 |
| 2002/0118848 A1 * | 8/2002 | Karpenstein | 381/119 |
| 2005/0155043 A1 * | 7/2005 | Schulz et al. | 719/328 |

OTHER PUBLICATIONS

"Visual Slider Controls", D. Bernath, et al. IBM TDB, vol. 35, No. 2, Jul. 1992.
Improved Visual Slider Control, L. J. Najjar, IBM TDB, vol. 36, No. 09B, Sep. 1993.

* cited by examiner

Primary Examiner—Crystal Barnes-Bullock
(74) Attorney, Agent, or Firm—Harrington & Smtih, PC

(57) ABSTRACT

The present invention concerns methods and apparatus for enabling manual control over selection of a value for at least one operating parameter of a computer system resource. Manual control is enabled by de-coupling a pointer of a graphical indicator and control from an automated system advisor. During automated operation, the automated system advisor selects the value for the parameter of the computer system resource as indicated on a scale of the graphical indicator and control by the pointer. When the pointer of the graphical indicator is under manual control, a user can select the value of the at least one operating parameter of the computer system resource using the pointer of the graphical indicator and control. The present invention also concerns methods and apparatus for disabling manual control over selection of a value for at least one operating parameter of a computer system resource by re-coupling the pointer to an automated system advisor. The present invention further concerns hybrid control modes that permit users to exercise a degree of control over operations of an automated selection process in a graphical indicator and control.

14 Claims, 13 Drawing Sheets

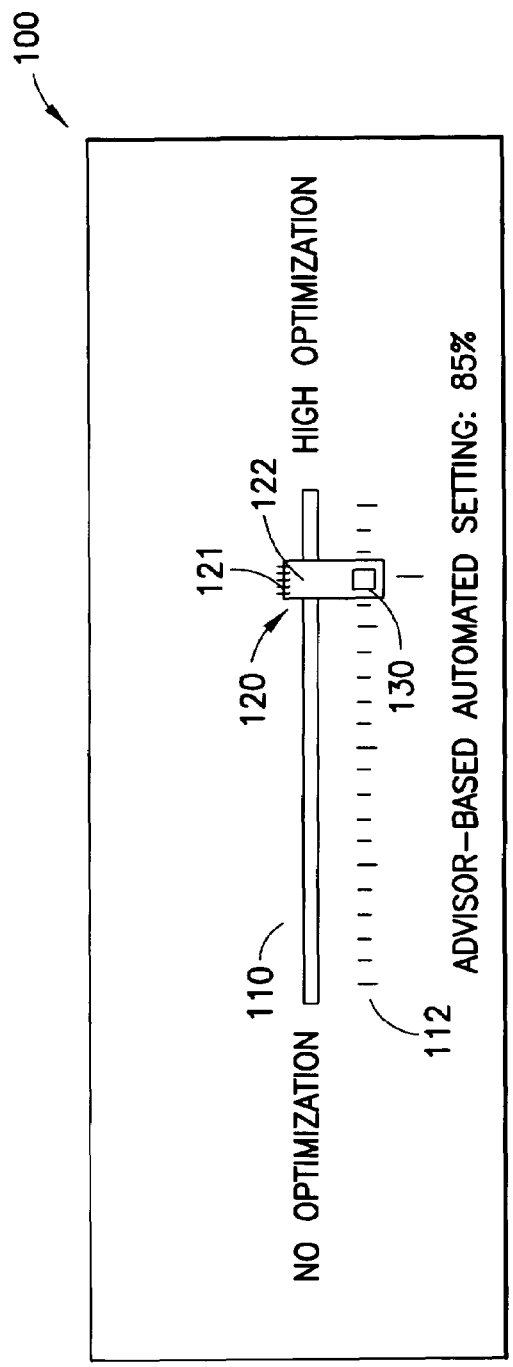
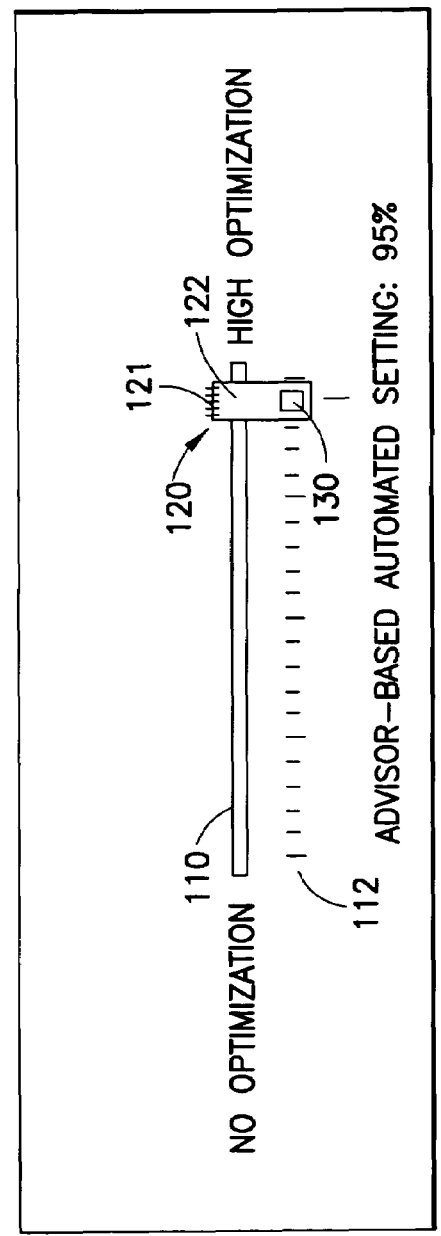
FIG.3
FIG.4

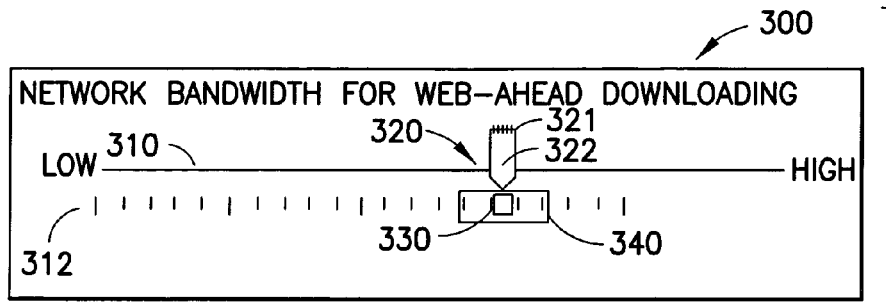
FIG.12A
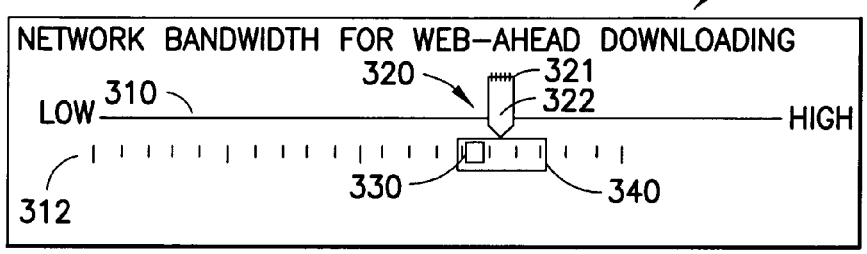
FIG.12B
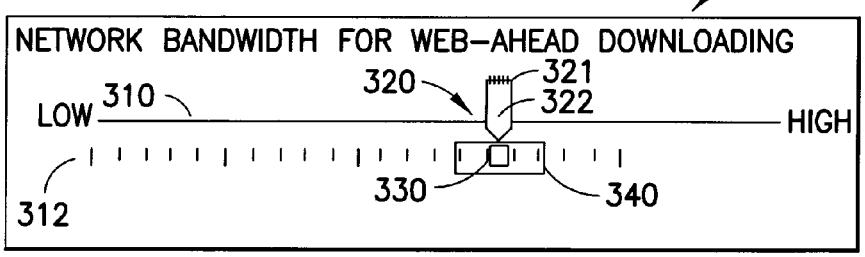
FIG.12C
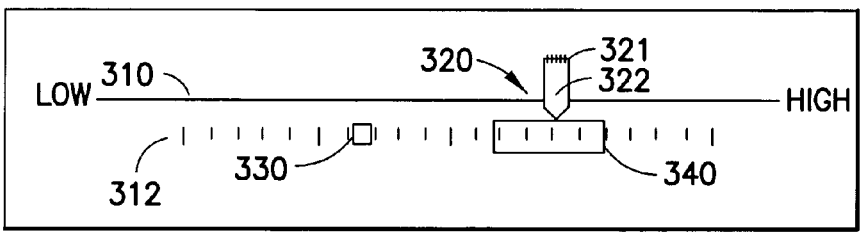
FIG.12D
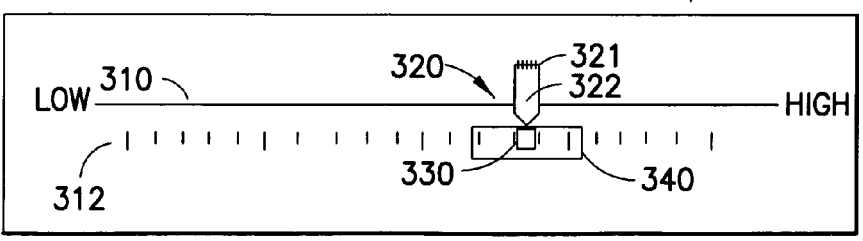
FIG.12E
FIG.12

METHODS AND APPARATUS FOR IMPLEMENTING MANUAL AND HYBRID CONTROL MODES IN AUTOMATED GRAPHICAL INDICATORS AND CONTROLS

TECHNICAL FIELD

The present invention generally concerns graphical indicators and controls having automated control modes for selecting one or more values of one or more parameters of a computer system resource, and more particularly concerns methods and apparatus for enabling manual and hybrid control modes in graphical indicators and controls to permit users both to manually select one or more values of the one or more parameters of the computer system resource, and to exercise a degree of control over operations of the automated control modes.

BACKGROUND

User settings for policy-based automations are typically fairly "hard-coded" and relatively inflexible. They are composed of many individual rules, with no high-level or collective means for adjusting them. For instance, SAN File System provides automated initial file placement via a multiplicity of rules. In a system having thousands of rules which requires periodic adjustment (as an aside, mature policy-based systems such as DFSMS can have more than ten thousand rules), a user would be required to change settings in hundreds of rules at a time. This routine and necessary maintenance would be both tedious and error-prone.

Those skilled in the art have been considering adding higher-level service class rules, which would help, but even with these there will not be a single easy and high-level way for users to exercise a degree of control over operations by, for example, manually "tweaking" the overall policy optimization; enabling the manually "tweaked" policy optimization; and disabling the manually "tweaked" policy optimization. Thus, there are no current means for seeing what performance gains are available through manual optimization of ordinarily automated controls.

Other problems with automated systems concern their difficulty in establishing user trust and the need for providing means to enable users to effectively monitor the automated systems. It can take many years for users to develop trust in a system. Automated systems with a multitude of possible control settings can be very hard to monitor and maintain—such systems are often essentially neglected by software vendors and thought to be "black boxes" by users.

In addition to the problems encountered in rule-based automated systems there are also problems encountered in situations where the selection of settings for a product require tuning. For example, it is often unclear whether it is best to provide user control over the tuning of parameters (for example, for various heartbeat intervals, wait periods, retries and buffer sizes), or to automate them completely in a manner invisible to users. Weighing in on the side of user control is that users typically prefer control, especially for new products that they do not trust yet. User control also helps users to learn how the system works and therefore to truly understand the system. Weighing against surfacing user control for tuning settings is that some users might choose sub-optimal settings.

When users are polled, they overwhelmingly demand to have manual overrides to automations. They also want such overrides to be easily selected and quickly implemented.

Note that in the highly-evolved user interface paradigm of automobiles that manual overrides have evolved to be easily selected and quickly implemented. For example, to disable active cruise control, a driver just taps the brakes or pushes the off button. In an automatic transmission, a driver uses the multi-function gear selector to quickly and easily shift an automobile from drive to second gear when approaching a steep downslope.

Accordingly, those skilled in the art desire the ability to exercise a measure of control over automated processes that ordinarily control selection of one or more values for one or more parameters of a computer system resource. In one aspect, those skilled in the art desire the ability to disable momentarily the automated process selecting values for the plurality of settings, so that the user can manually adjust a value indicated by a graphical advisor. By making adjustments to the value indicated by the graphical advisor, the user also effectively would be changing one or more settings for the computer system resource. A system implemented in this way would make it far easier for a user to change hundreds or perhaps thousands of settings selected for the computer system resource.

In other situations, those skilled in the art may not want direct control over the plurality of settings selected for the computer system resource. In these situations, the user may desire that the automated process ordinarily selecting the settings for the computer system resource continue to operate, but be subject to a measure of control by the user. For example, oftentimes it is costly in terms of system resources to spawn numerous small-scale changes called for by the automated process throughout a complex computer system resource like a networked database. In such situations, the user may desire that the automated process continue to make large-scale changes to the settings required by work loads that vary in a predictable manner over a daily period, but ignore small-scale changes required by minute moment-to-moment variations in load conditions. In other situations where load conditions spike and then return to a nominal value, the user may desire that the automated process respond to small-scale variations in load conditions but ignore large-scale changes.

In summary, those skilled in the art thus desire controls that enable users to exercise some measure of control over how an automated process makes changes to one or more settings of a computer system resource.

SUMMARY OF THE PREFERRED EMBODIMENTS

A first embodiment of the present invention comprises a signal-bearing medium tangibly embodying a program of machine-readable instructions executable by a digital processing apparatus of a computer system to perform operations for controlling an interactive graphical user interface, the operations comprising: displaying a graphical indicator and control comprising a scale, where a value indicated on the scale corresponds to a setting selected for at least one parameter of a computer system resource by an automated process of the computer system; and displaying an interactive graphical feature that under user command engages and disengages a manual control, wherein when the manual control is engaged a user is permitted to exercise at least some degree of control over the value indicated on the scale of the graphical indicator and control.

A second embodiment of the present invention comprises a computer system for displaying an interactive graphical user interface on a display device of a computer system, the computer system comprising: at least one memory to store at least one program of machine-readable instructions, where the at least one program performs operations to display the interactive graphical user interface when executed; at least one processor coupled to the at least one memory, where the at least one processor performs at least the following operations when the at least one program is executed: displaying a graphical indicator and control comprising a scale, where a value indicated on the scale corresponds to a setting selected for at least one parameter of a computer system resource by an automated process of the computer system; and displaying an interactive graphical feature that under user command engages and disengages a manual control, wherein when the manual control is engaged a user is permitted to exercise at least some degree of control over the value indicated on the scale of the graphical indicator and control, thereby also exercising at least some degree of control over the setting selected for the at least one parameter of the computer system resource.

A third embodiment of the present invention comprises a graphical user interface control system method comprising: displaying a graphical indicator and control comprising at least in part a scale on a display device of a computer system, where a value indicated on the scale corresponds to a setting selected for at least one parameter of a computer system resource by an automated process of the computer system; and displaying an interactive graphical feature that under user command engages and disengages a manual control, wherein when the manual control is engaged a user is permitted to exercise at least some degree of control over the value indicated on the scale of the graphical indicator and control.

A fourth embodiment of the present invention comprises a computer system for displaying an interactive graphical user interface on a display device of a computer system, the computer system comprising: memory means to store at least one program of machine-readable instructions, where the at least one program performs operations to display the interactive graphical user interface when executed; processor means coupled to the at least one memory, where the at least one processor performs at least the following operations when the at least one program is executed: displaying a graphical indicator and control comprising a scale, where a value indicated on the scale corresponds to a setting selected for at least one parameter of a computer system resource by an automated process of the computer system; and displaying an interactive graphical feature that under user command engages and disengages a manual control, wherein when the manual control is engaged a user is permitted to exercise at least some degree of control over the value indicated on the scale of the graphical indicator and control.

Thus it is seen that embodiments of the present invention overcome the limitations of the prior art. In known computer system resources, possible settings for operating parameters of the computer system resources are proliferating, so that there may be hundreds, thousands, or possibly even tens of thousands of different settings for the operating parameters of the computer system resource. Because it is impractical to expect the settings to be continually monitored and changed by a human user, heretofore the computer system resource settings have ordinarily been controlled by an automated process.

This frequently results in a situation where a user is not satisfied with selections made for settings by the automated process. Nonetheless, manual control in accordance with the prior art does not present a practical alternative to automated control in such situations since there are, for example, either too many settings to fine-tune, or the interaction between individual settings is not well-understood by the user. When confronted with these problems, users desire a manual control that permits changes to one or more computer system resource settings without the limitations of prior art manual controls.

The methods and apparatus of the present invention allow a user to do this and therefore overcome the limitations of the prior art. For example, in an embodiment of the present invention, a user may de-couple a pointer of a graphical indicator and control from an automated system advisor, thereby enabling manual control over the pointer. Control over the pointer position in turn enables control over a value of one or more operating parameters of a computer system resource represented by the proxy of the pointer. Ordinarily, a value indicated on the scale of the graphical indicator and control by the pointer collectively summarizes a plurality of settings selected for the computer system resource by the automated system advisor. When the pointer is de-coupled from the automated system advisor, the automated selection process is de-activated and the user can collectively fine-tune the plurality of settings of the computer system resource by making changes to the value indicated on the sliding scale by the pointer. Computer program modules associated with the graphical indicator track changes made to the value indicated on the scale by the user and, in turn, make changes to the value of one or more parameters of a computer system resource to conform them to the changes made by the user.

A particular advantage of this embodiment of the present invention is that rules invoked when the pointer of the graphical indicator is under manual control can reflect known and learned interactions between computer system resource settings. Thus the user is not required to use system-automated settings that are known to be less than optimal or that have not yet earned the user's trust. Rather, changes implemented when the pointer of the graphical indicator is under manual control can reflect known interactions between computer system resource settings, and therefore avoid sub-optimal and self-defeating combinations of computer system resource settings.

The advantages of the present invention are not limited to a graphical indicator and control having a linear scale with a manually-controllable pointer, but can be applied to any graphical indicator. For example, the methods and apparatus of the present invention can be applied to a graphical indicator having a circular dial; in such embodiments the manual control can be implemented as the graphical representation of a rotary knob. In other embodiments where the graphical indicator comprises a digital readout, a manual control can be coupled to the readout to permit changes to the value indicated on the readout.

In other situations typically encountered in the prior art, a user (for example, a system administrator) may normally have no desire to change computer system resource settings selected by the automated process. In some instances, however, the system administrator may become dissatisfied if the automated process is changing computer system resource settings too frequently. This may not seem to be a significant problem until one considers the computational overhead involved in propagating changes throughout a complex computer system resource. In such situations a user may desire the ability to control when the automated process is permitted to make changes to the settings of the computer system resource. For example, frequent small-magnitude changes may be disfavored, while less frequent but largemagnitude changes required by varying computer system resource load conditions over a daily cycle may be desired.

An aspect of the present invention overcomes this limitation of the prior art. In methods and apparatus of the present invention, the user can select a tolerance level using a tolerance control that may be manually coupled and de-coupled to an automated system advisor of a graphical indicator and control. In such embodiments, the tolerance control limits the ability of the automated system advisor to make changes to the plurality of settings of the computer system resource. For example, the tolerance control can be implemented as a range limiter that graphically indicates a range within which changes recommended for the settings by the automated system advisor would be rejected and therefore not implemented. This "slack zone" would prevent frequent small and resource-consuming changes to the settings of the computer system resource.

In conclusion, the foregoing summary of the embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3 depicts a graphical indicator and control having a pointer, where the pointer has been re-coupled to an automated system advisor and is no longer subject to an inline manual control, all operating in accordance with an embodiment of the present invention;

FIG. 4 depicts a graphical indicator and control having a pointer, where the pointer is coupled to an automated system advisor and not subject to an inline manual control, all in accordance with an embodiment of the present invention;

FIGS. 12A-E depicts the operation of a graphical indicator and control when an inline range limiter is coupled to an automated system advisor that recommends settings for a computer system resource, all operating in accordance with a further embodiment of the present invention;

DETAILED DESCRIPTION OF THE PREFERRED EMBODIMENTS

Figure 1:
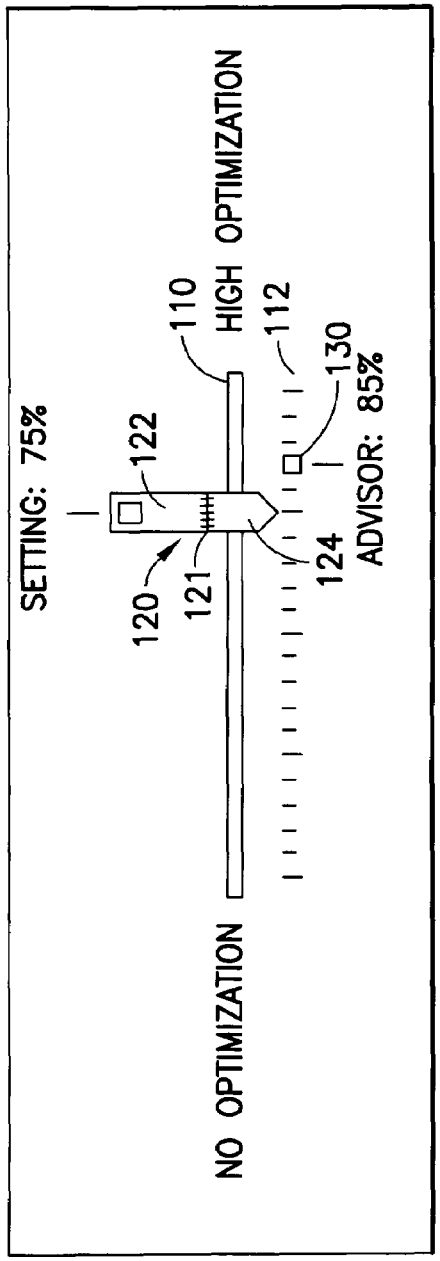
FIG. 1 depicts a graphical indicator and control having a pointer, where the pointer has been de-coupled from an automated system advisor and is subject to an inline manual control in accordance with an embodiment of the present invention.

As depicted in FIGS. 1-5, the present invention de-couples an advisor pointer 130 subject to control by an automated process from a pointer 120 of a graphical indicator and control 100 to enable an inline manual control over the pointer 120. Control over the pointer effectively confers control over one more settings of a computer system resource whose operating state is displayed on the graphical indicator and control 100. In the embodiment depicted in FIG. 1, scale 110 is linear in form with gradations 112 indicated, but other scale and gauge formats (for example, circular, semi-circular, digital, gauges with two or more axes) are within the scope of the present invention. A value indicated on the scale 110 corresponds one or more values selected for one or more settings of a computer system resource by an automated process.

"Computer system resource" within the context of the present invention may comprise a stand-alone computer; a networked collection of computers; a database; a networked collection of databases; a monitoring or surveillance system that is computer-based; a software program; or any other apparatus or system having a one or more settings subject to computerized control.

"Automated process" within the context of the present invention comprises a computerized system for selecting settings for the computer system resource. The automated process may be static or dynamic. For example, a static automated process may be encountered in an operating system or productivity suite where a plurality of settings are pre-selected and do not change unless through end-user intervention. A dynamic automated process, on the other hand, may be encountered in networked collections of computers or databases, where the automated process is continually making changes or change recommendations to a plurality of settings depending on load or utilization conditions.

FIG. 1 depicts the initial state of a pointer 120 subject to manual control in accordance with the present invention; this is indicated by the presence of an automation-setting control tab 122 in a retracted position (swung upward about the graphical representation of a hinge 121). When the automation-setting control tab 122 is in the retracted position, pointer 120 is subject to manual control; a user can make changes to the value indicated on the scale 110 by "grabbing" the handle portion 124 of the pointer 120 with a cursor and adjusting the pointer to a desired value. Exactly how the cursor interacts with the handle portion is an implementation issue; any number of cursor actions with or without one or more clicks of a mouse-like device may be used to move pointer 120 in accordance with embodiments of the present invention.

The value indicated on the scale 110 by pointer 120 corresponds to settings selected for the computer system resource. In some embodiments, the value corresponds to a value selected for a single computer system resource parameter. In other embodiments, the value collectively summarizes a plurality of settings selected for operating parameters of a computer system resource. Thus, when the user makes a change to the value indicated on the scale with the pointer 120, a response by the computer system is required to conform the one or more settings of the computer system resource to the change made by the user. Typically, a software program operating in a pre-determined manner receives changes made to the value indicated on the scale and, in turn, makes changes to at least one of the plurality of settings for the computer system resource. As depicted in FIG. 1, the setting recommended by the automated process continues to be displayed as indicated by advisor pointer 130. When the graphical indicator is in automated control mode, the automation-setting control tab 122 swings downward (about the graphical representation of a hinge 121) and overlaps the advisor pointer 130 and the manual control tab 124 as depicted in FIGS. 3 and 4.

A particular advantage of the present invention arises from the pre-determined responses to manual changes made to the value indicated on the scale. In situations involving computer system resources having many settings to select, to make changes to the settings, an end user would have to access a menu of radio buttons or check boxes. Changes made in this manner are often haphazard since a user may not have a significant understanding of the interrelationships between settings. For example, it is not unreasonable to expect in dynamic management situations that individual settings may conflict if not chosen wisely. In such situations, one-at-a-time selections of system settings may result in a sub-optimal combination of settings that are even worse than if chosen by the automated process.

By making changes to the plurality of settings through the proxy of the value indicated on the scale, in embodiments of the present invention the user can draw upon knowledge of those who have designed the computer system resource because their knowledge is reflected in the software program responding to changes made by the user.

Figure 2:
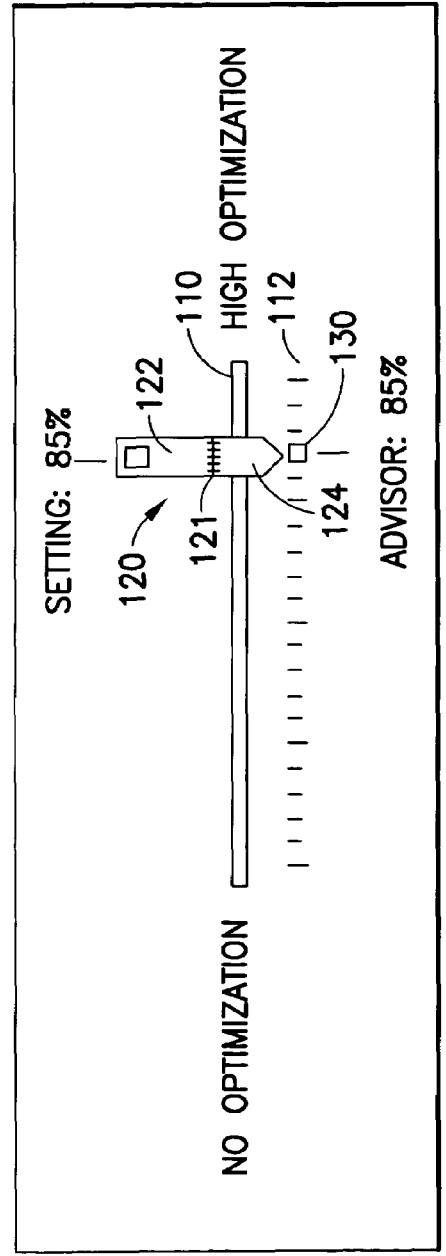
FIG. 2 depicts a graphical indicator and control having a pointer, where the pointer has been de-coupled from an automated system advisor and is subject to an inline manual control in accordance with an embodiment of the present invention.

FIG. 2 depicts a situation where the user has become dissatisfied with a personal selection and has brought the setting into alignment with that suggested by the automated process as indicated by the relative positions of pointer 120 and advisor pointer 130.

FIG. 3 reflects the appearance of the graphical indicator and control 100 after manual control has been relinquished. This is accomplished by clicking on any portion of the automation-setting control tab 122 with a cursor; this causes the automation-setting control tab to swing downward thereby overlapping the manual control tab 124; to move to a value indicated by the advisor pointer 130; and to overlap and attach to the advisor pointer 130 at that position. Again any combination of cursor actions known to those skilled in the art may be used to effect the change from manual control to automated control. Further, graphical elements and animations described with reference to embodiments of the present invention are exemplary; graphical indicators having manual and hybrid controls in accordance with the present invention can be implemented with other combinations of graphical elements with or without animations.

FIG. 4 reflects the appearance of the graphical indicator and control 100 after the automated process has made a change to the plurality of settings associated with the computer system resource. The setting has been changed by the automated process to 95% as indicated by pointer 120.

Figure 5:
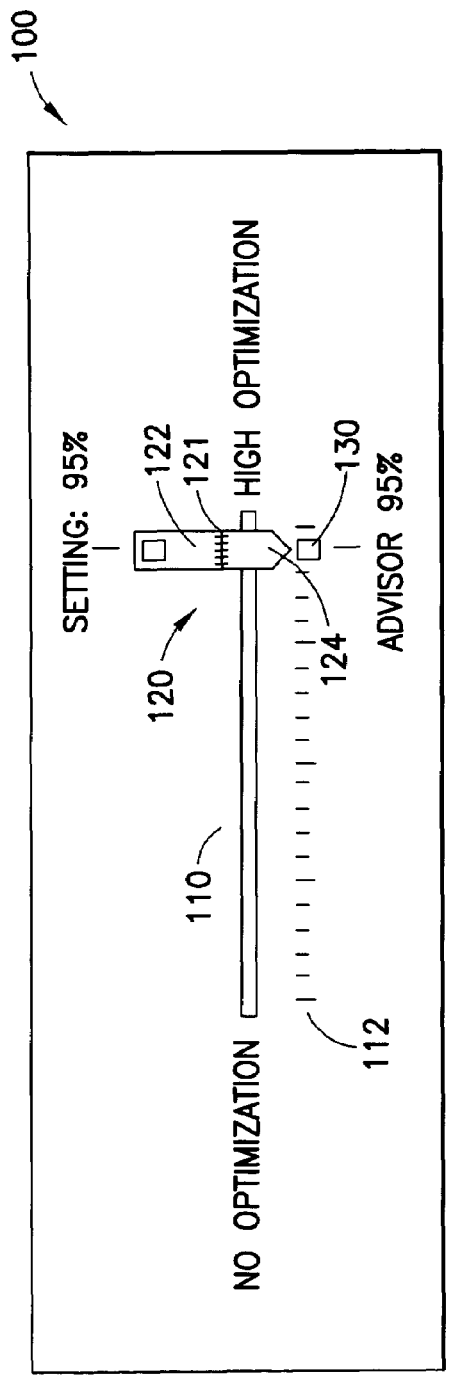
FIG. 5 depicts a graphical indicator and control having a pointer, where the pointer has been de-coupled from an automated system advisor and is again subject to an inline manual control, all in accordance with an embodiment of the present invention.
Figure 6:
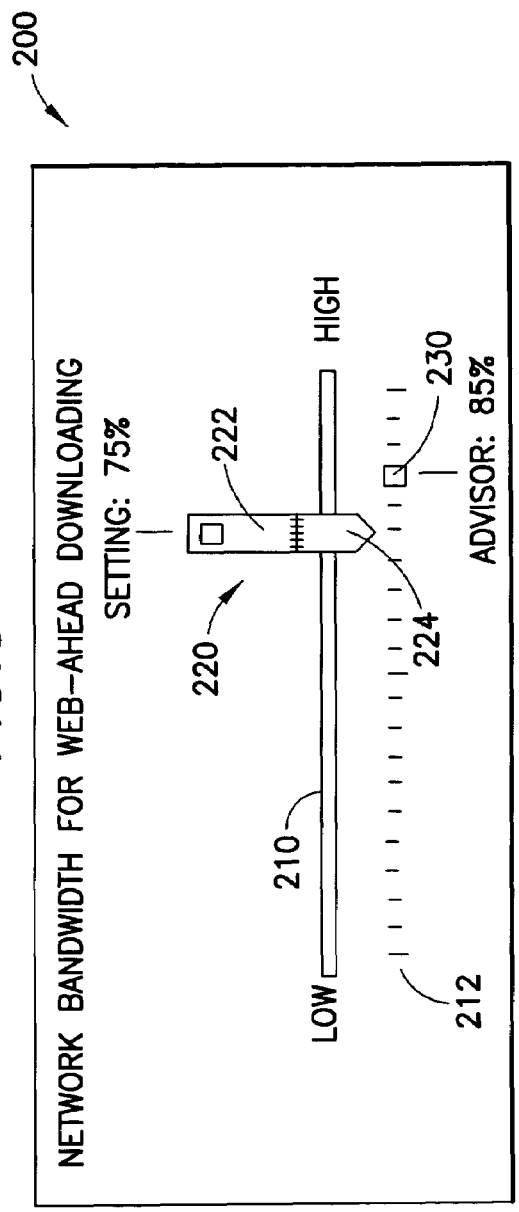
FIG. 6 depicts a graphical indicator and control having a pointer, where the pointer has been de-coupled from an automated system advisor and is subject to an inline manual control in accordance with another embodiment of the present invention.

Assuming the user later becomes dissatisfied with the value selected by the automated process, the user can return the selection process to manual control by clicking on the automation-setting control tab 122 with a cursor. This causes the automation-setting control tab 122 to swing upward about the graphical representation of a hinge 121, thereby revealing the manual control tab 124 as depicted in FIG. 5.

Another embodiment of the present invention is depicted in FIGS. 6-11. In this embodiment, the control alternates between manual control and a loosely-coupled automation. In the loosely-coupled automation setting situation, the user selects a range which governs how much slack is in the coupling. In FIGS. 6-11, when in the hybrid, loosely-coupled mode, the range control causes the system to reject small-scale changes called for by the automated process within the range specified by a user, but to respond to changes called for by the automated process outside the range specified by the user.

As in the case of the preceding embodiment, the graphical indicator 200 comprises a scale 210 with gradations 212. In the state depicted in FIG. 6, pointer 220 is in fully manual mode as indicated by the position of the automation-setting control tab 222 and the visibility of the manual control "handle" portion 224 of the pointer 220. When the user elects to switch to automated mode, the difference between the present embodiment and the preceding embodiment becomes evident in FIG. 7. When the automated control tab swings downward about hinge 221, a previously-selected range limiter 240 appears. The range limiter is selected by grasping the bottom-most portion of the automated control tab and "stretching it" in a way that will be described in more detail with reference to FIG. 11.

Figure 7:
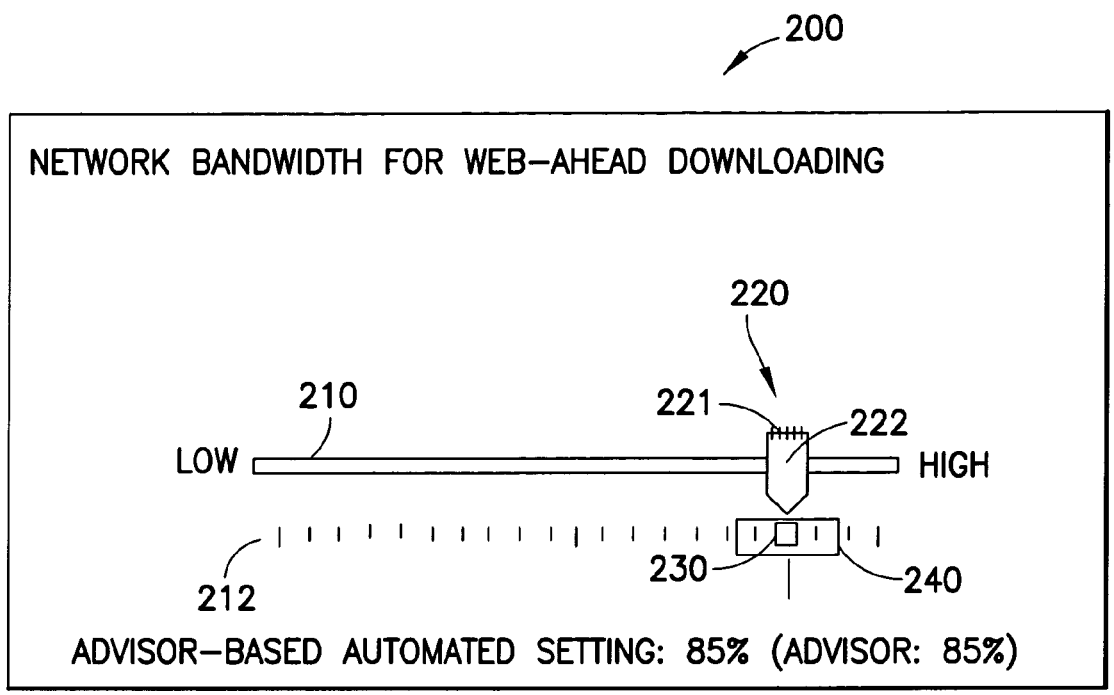
FIG. 7 depicts a graphical indicator and control after a user has coupled an inline range limiter to an automated system advisor that recommends settings for a computer system resource, all operating in accordance with another embodiment of the present invention.

As described previously, in the embodiment of the present invention depicted in FIGS. 6-11, the loosely-coupled automated mode actually is hybrid in nature and confers upon the user a degree of control and buffer over the actions of the automated process. In FIG. 7, range limiter 240 extends from 80% to 90%. Its range is set to span 10% of the scale, and is initially centered in the example. At the moment depicted in FIG. 7, the automated process recommends a setting of 85%, which happens to correspond to a set point initially chosen by the user when switching to the hybrid mode. The initial set point in this embodiment, in combination with the range limiter, exercise a degree of user control and buffer over the actions of the automated process. Changes called for by the automated process that fall within the range limiter 240 are rejected; only changes that fall outside the range limiter 240 are accepted. Typically, such control would be employed when the cost of spawning small and frequent changes throughout a complex dynamic system would outweigh the benefit from many small-scale adjustments. However, the system would react to larger changes that typically accompany changes in load conditions associated with the computer system resource.

Figure 8:
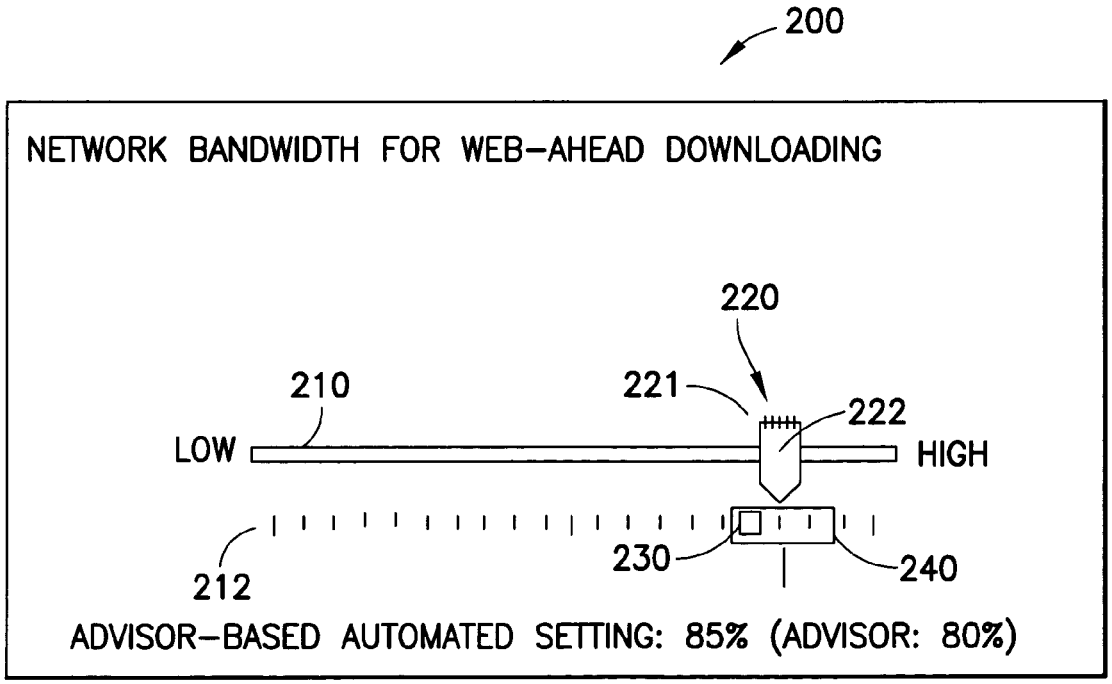
FIG. 8 depicts the operation of a graphical indicator and control when an inline range limiter is coupled to an automated system advisor that recommends settings for a computer system resource, all operating in accordance with another embodiment of the present invention.
Figure 9:
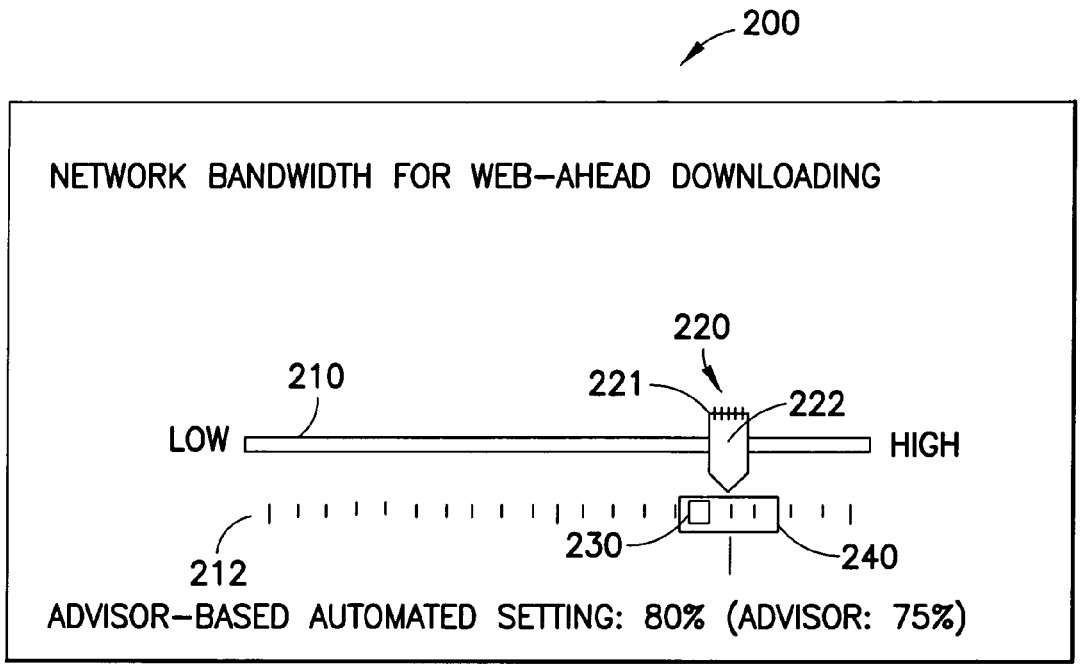
FIG. 9 depicts the operation of a graphical indicator and control when an inline range limiter is coupled to an automated system advisor that recommends settings for a computer system resource, all operating in accordance with another embodiment of the present invention.
Figure 10:
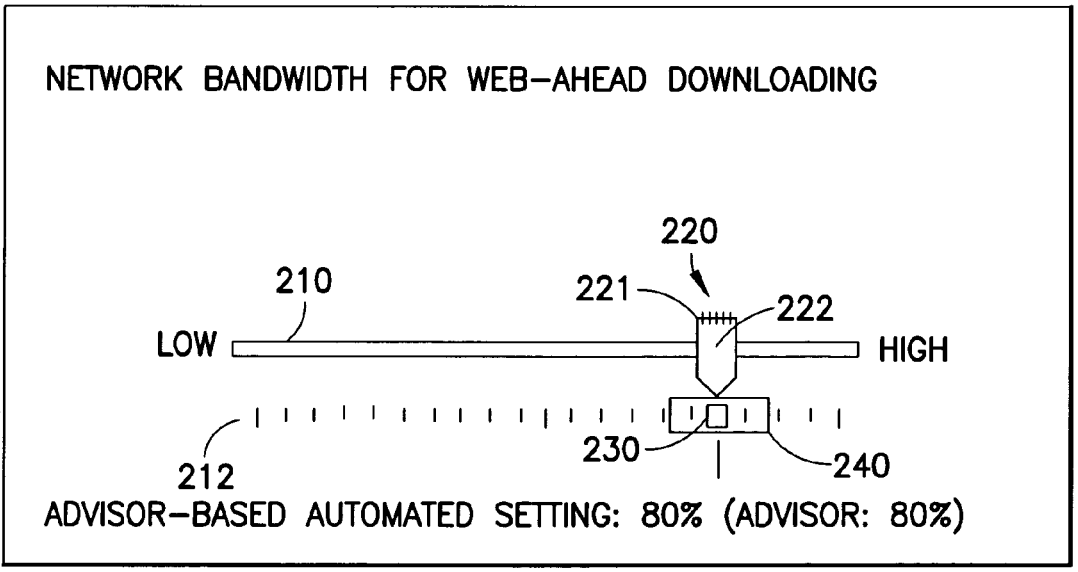
FIG. 10 depicts the operation of a graphical indicator and control when an inline range limiter is coupled to an automated system advisor that recommends settings for a computer system resource, all operating in accordance with another embodiment of the present invention.

The various operations are depicted in FIGS. 8-10. For example, in FIG. 8 the automated process calls for a new setting of 80% as indicated by the advisor pointer 230. However, since this value falls within the range limiter 240, it is effectively ignored.

Next, in the example depicted in FIG. 9, the automated process recommends a value of 75%. This value falls outside the initial range of 80% to 90% so the system responds to this change by moving the pointer 220 5% in the direction of the change. As is apparent, this imparts a dampening effect, as the set point only changes in response to large changes called for by the automated process.

In the example depicted in FIG. 10, the automated process again calls for a value within range limiter 240; the system ignores this advice and the set point does not change.

Figure 11A:
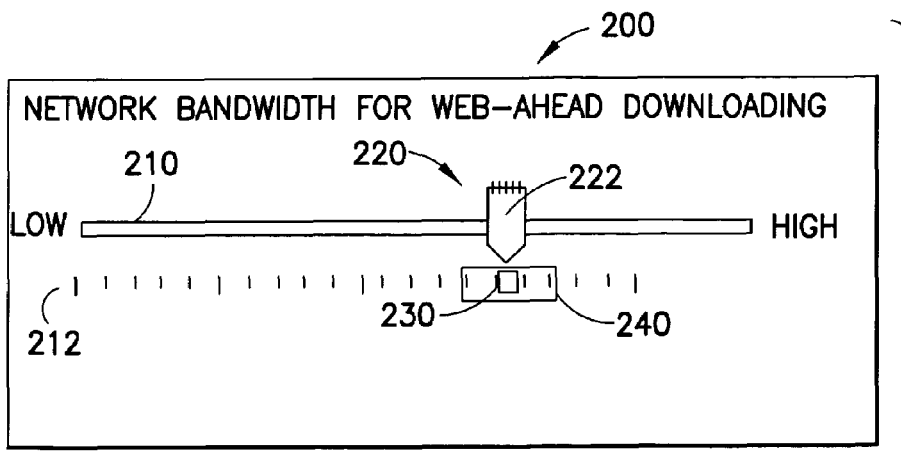
FIGS. 11A-C depicts user adjustment of an inline range limiter operating in accordance with another embodiment of the present invention.
Figure 11B:
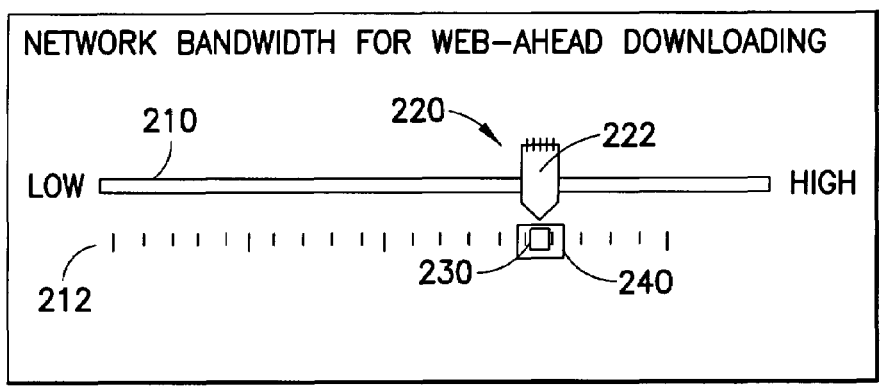
Figure 11C:
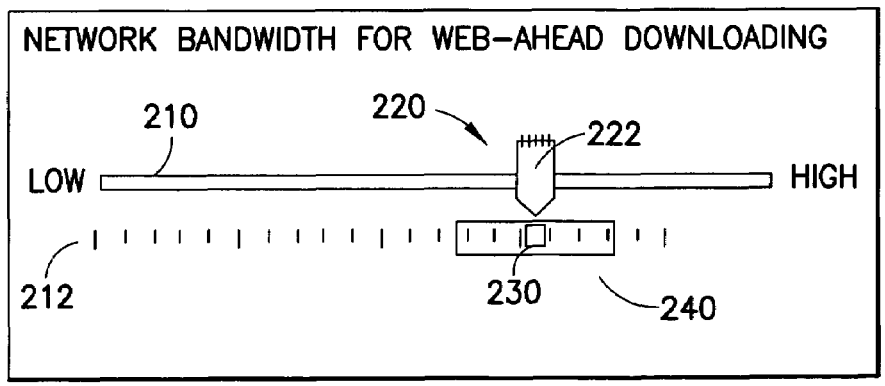

FIGS. 11A-C depicts how the width of the range limiter 240 can be changed. In FIG. 11A, the range limiter has a dimension similar to that depicted in FIGS. 7-10. In FIG. 11B, a user has adjusted the width of the range limiter downward, making the system more sensitive to changes called for by the automated process. In FIG. 11C, the user has adjusted the width of the range limiter upward, making the system less sensitive to changes called for by the automated process. Adjustment of the dimension of range limiter can be accomplished in many ways known to those skilled in the art. In one example, a user could figuratively grasp a side of the range limiter with a cursor and "stretch" it back and forth until the desired width is achieved. In such an embodiment, the user need only grasp one side of the range limiter 240; the other side would expand and contract in synchronism with the side being grasped by the user.

FIGS. 12A-E depicts a further embodiment of the present invention which also functions in a hybrid manner allowing a user to switch between exercising full manual control over the settings of the computer system resource, to exercising a degree of control over the automated process in a hybrid control mode. As is apparent, this embodiment operates in combination with a graphical indicator 300 having a scale 310 with gradations 312. The pointer 320 comprises a manual control handle (not visible) and an automated control tab 322. In FIGS. 12A-E, the user has already elected that the system operate in a hybrid automated control mode so the automation control tab 322 has swung downward about the virtual representation of a hinge 321, thereby revealing the range limiter 340.

In the further embodiment of the present invention depicted in FIGS. 12A-E, the hybrid automated control mode operates differently than in the embodiment depicted in FIGS. 6-10. In the embodiment depicted in FIGS. 6-10, the system rejected small-scale changes called for by the automated process that fall within a range specified by a user, but reacted to large-scale changes called for by the automated process. In the further embodiment depicted in FIGS. 12A-E, the system does the opposite; it rejects large-scale changes, but responds to small scale changes. Such an approach would be applicable where exercising fine control over a plurality of settings of a computer system resource is crucial, but it occurs in an environment where there are occasional transients requiring large-scale changes to the settings that should be ignored.

The workings of the further embodiment depicted in FIGS. 12A-E will now be described. FIG. 12A depicts the initial state of the system. The advisor pointer 330 and the pointer 320 indicate a setting corresponding to 77.5%, which is the setting the system adopts for the one or more settings of the computer system resource. In FIG. 12B, the advisor pointer indicates a change of about 5% to 72.5%, which falls within the range of acceptable change set by the user using the range limiter 340. Accordingly, as depicted in FIG. 12C, the system adopts the setting recommended by the automated process and the pointer moves to 72.5% to indicate this fact.

Later, the automated process, due to a transient, calls for a large scale change as depicted in FIG. 12D, where the advisor pointer recommends a value of 42.5% for the plurality of settings for the computer system resource. This falls well outside the range of acceptable change selected by the user using the range limiter 340, so the pointer does not move and the system maintains a setting of 72.5%. In FIG. 12E, the automated process later recommends a setting of 67.5%, which falls within the range depicted in FIG. 12E. Accordingly, the system assumes this value and the pointer moves to indicate this.

Figure 13:
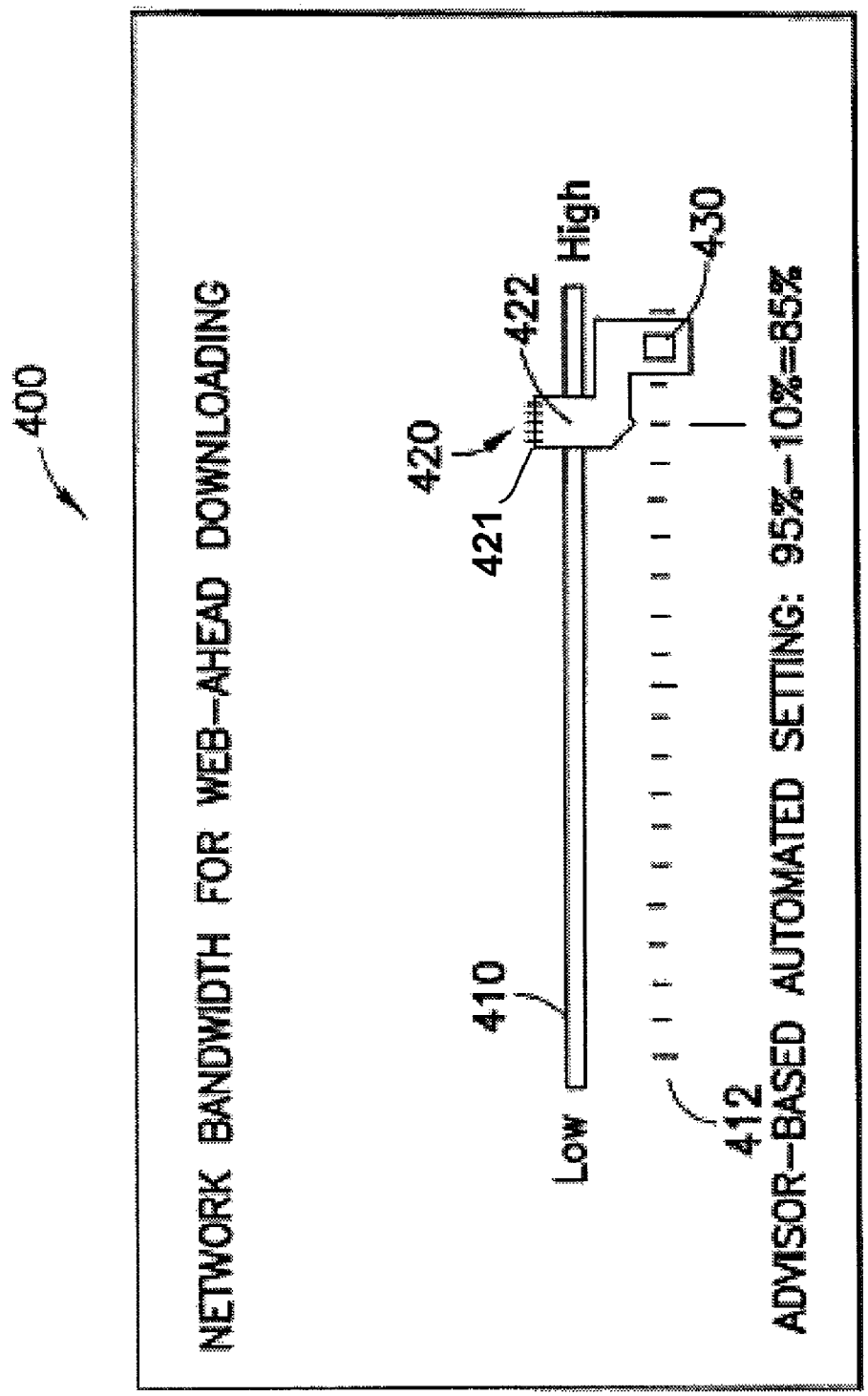
FIG. 13 depicts the operation of a graphical indicator and control when an offset control is coupled to an automated system advisor that recommends settings for a computer system resource, all operating in accordance with yet another embodiment of the present invention.

FIG. 13 depicts yet another embodiment of the present invention. As indicated, the graphical indicator and control 400 depicted in FIG. 13 comprises a scale 410 with gradations 412 and a pointer 420 configured to operate in accordance with the invention. Similar to the immediately preceding two embodiments depicted in FIGS. 6-10 and FIGS. 12A-E, this embodiment also allows a user to exercise a degree of control over the value called for by the automated process. In this embodiment, the system selects an operating point that is 10% less than whatever is called for by the automated process. The offset—in this case 10%—is user selectable in the graphical indicator and control 400 depicted in FIG. 13.

As is apparent in FIG. 13, the graphical indicator and control is in a hybrid automated control mode since the automated control tab 422 has swung downwards about the graphical representation of a hinge 421. The advisor pointer 430 indicates a recommended value for the plurality of settings of 95%, but due to the user-selected offset, the pointer assumes a value of 85%.

Figure 14:
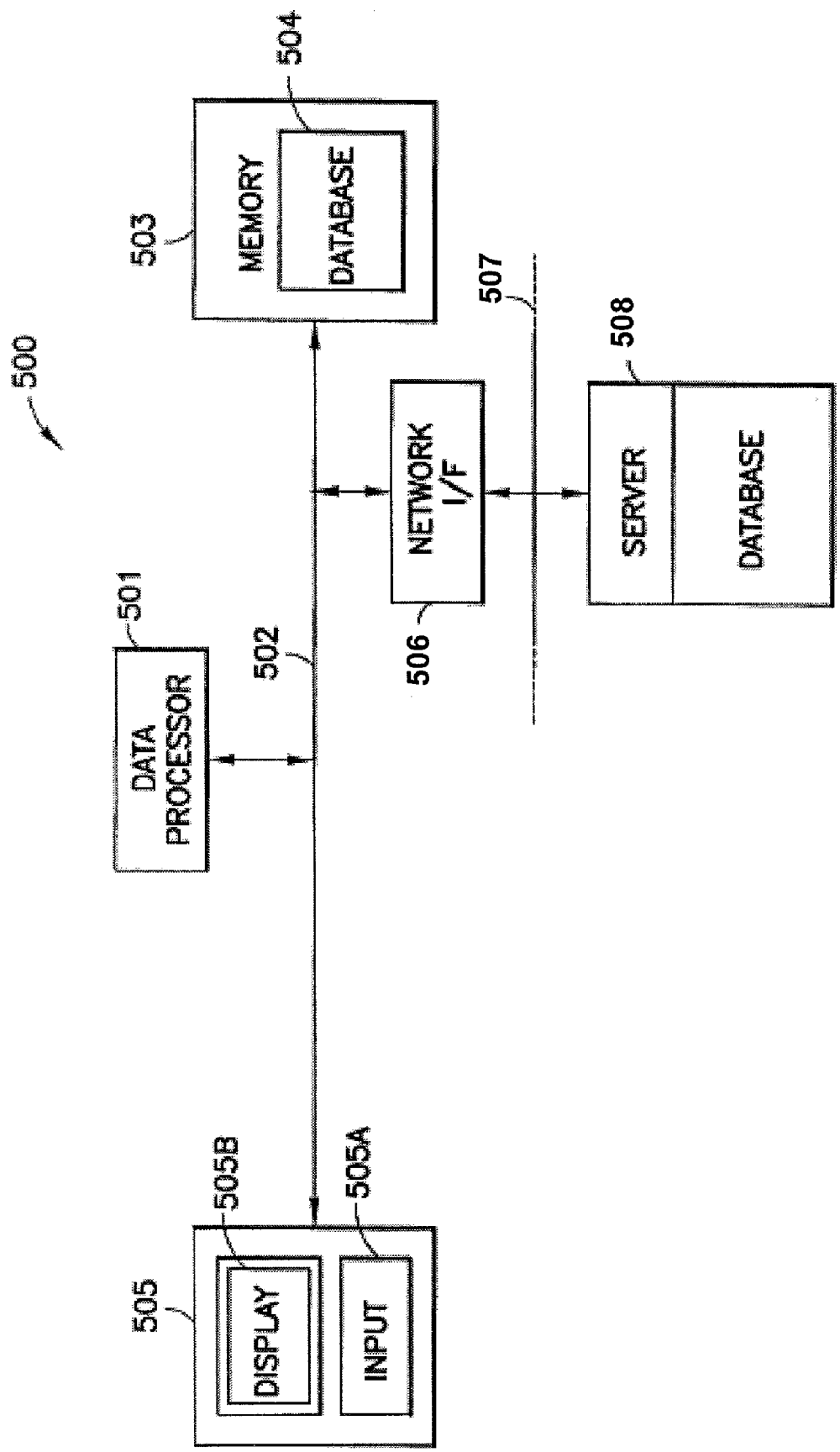
FIG. 14 depicts a block diagram of a computer system suitable for practicing the methods of the present invention.

A computer system suitable for practicing the methods of the present invention is depicted in simplified form in FIG. 14. The computer system 500 includes at least one processor 501 coupled to a bus 502 through which the data processor may address a memory sub-system 503, also referred to herein simply as "memory" 503. The memory 503 may include RAM, ROM and fixed and removable disks and or tape. The memory 503 is assumed to store at least one program comprising instructions for causing the processor 501 to execute methods in accordance with the present invention. Also stored in memory 503 is at least one database 504 that may be managed with the methods and apparatus of the present invention.

The data processor 501 is also coupled through the bus 502 to a user interface, preferably a graphical user interface ("GUI") 505 that includes a user input device 505A, such as one or more of a keyboard, a mouse, a trackball, a voice recognition interface, as well as a user display device 505B, such as a high resolution graphical CRT display terminal, a LCD display terminal, or any suitable display device.

The data processor 501 may also be coupled through the bus 502 to a network interface 506 that provides bidirectional access to a data communications network 507, such as an intranet and/or the internet. A database resident on server 508 accessible through the internet 507 may similarly be managed using methods and apparatus of the present invention.

In general, these teachings may be implemented using at least one software program running on a personal computer, a server, a microcomputer, a mainframe computer, a portable computer, an embedded computer, or by any suitable type of programmable data processor 501. Further a program of machine-readable instructions capable of performing operations in accordance with the present invention may be tangibly embodied in a signal-bearing medium, such as a CD-ROM.

Figure 15:
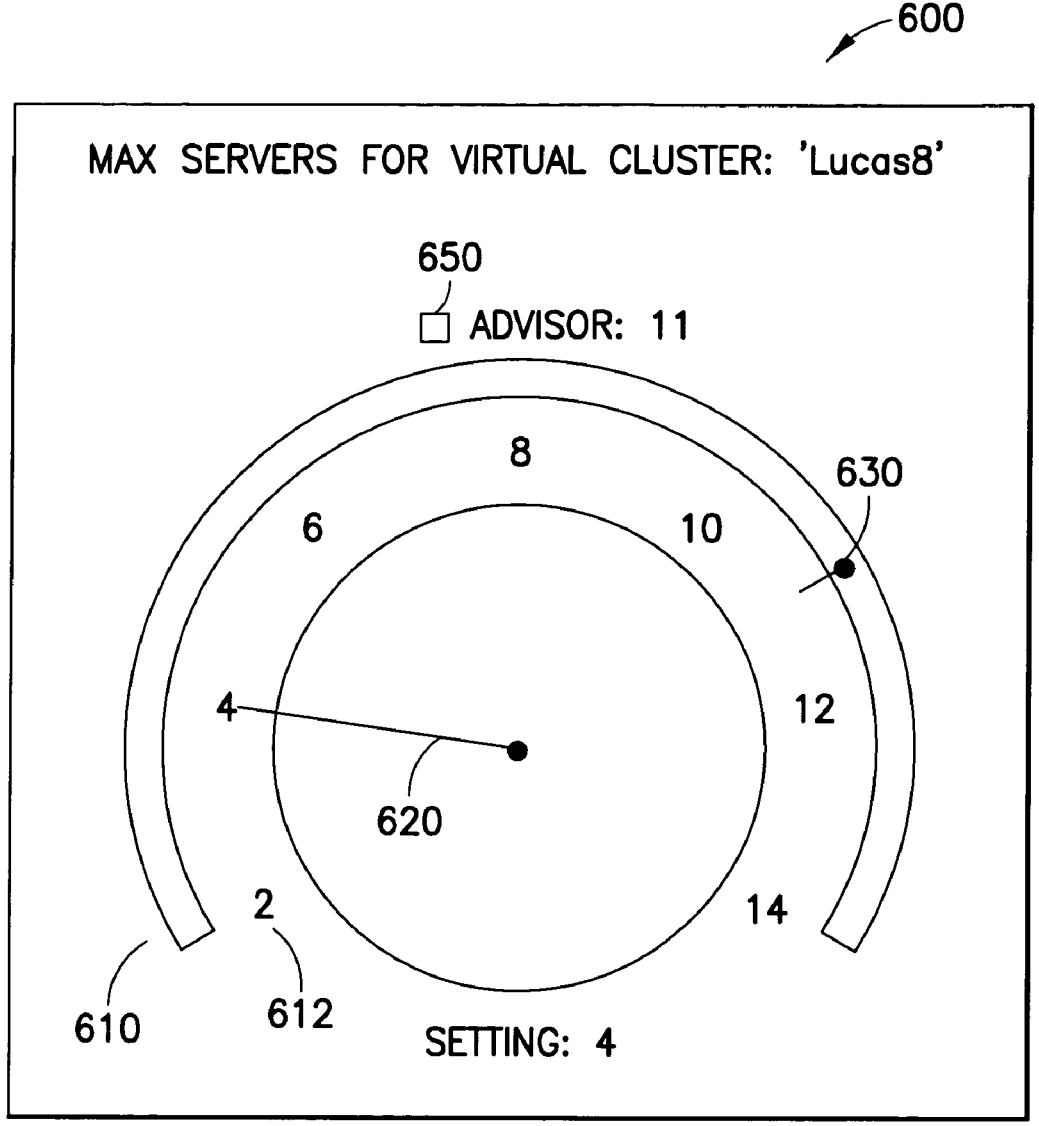
FIG. 15 depicts a rotary graphical indicator and control having a pointer, where the pointer has been de-coupled from an automated system advisor and is subject to an inline manual control, all operating in accordance with a still further embodiment of the present invention.
Figure 16:
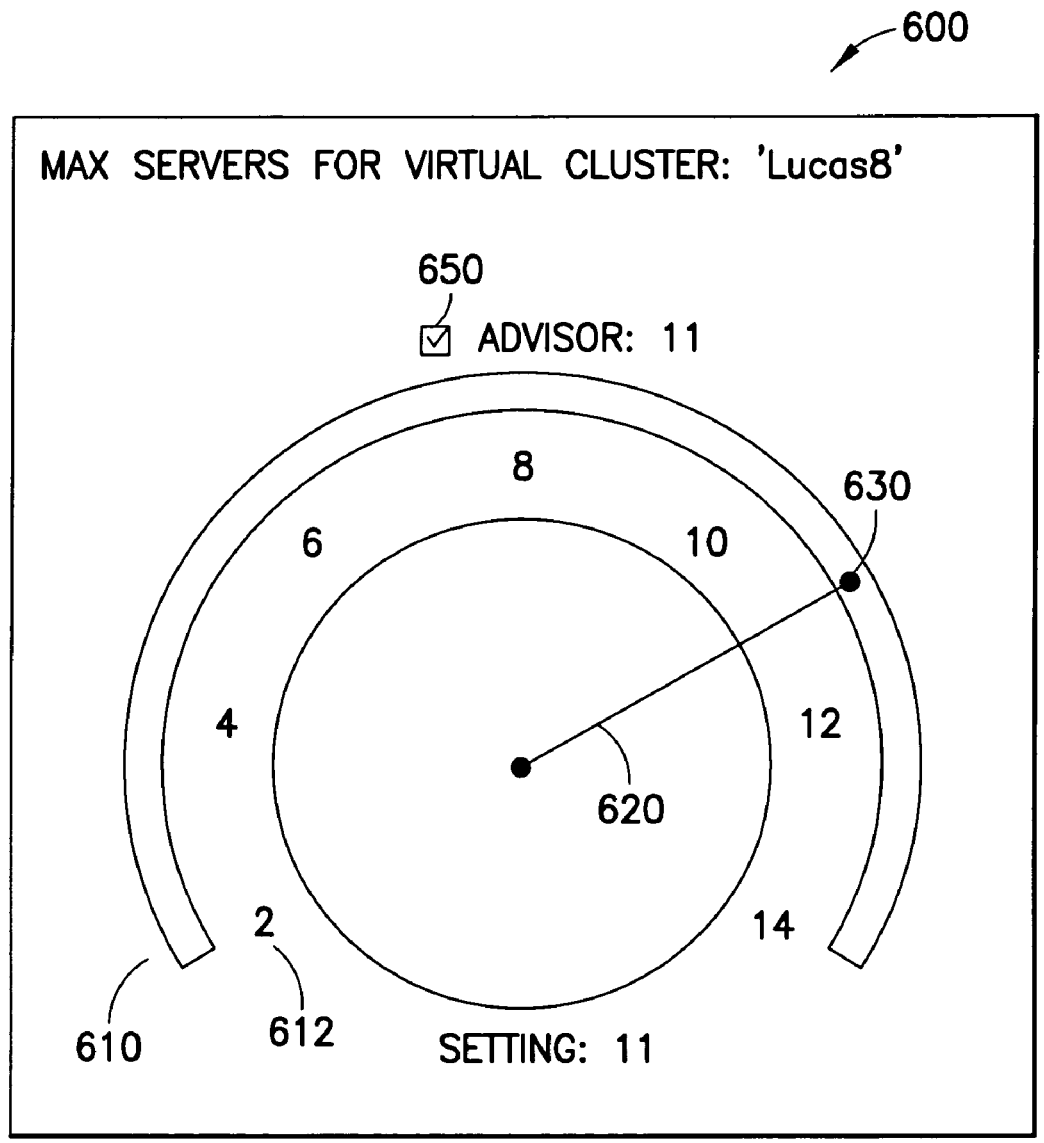
FIG. 16 depicts a rotary graphical indicator and control having a pointer, where the pointer has been re-coupled to an automated system advisor and is no longer subject to an inline manual control, all operating in accordance with a still further embodiment of the present invention.

A still further embodiment of the present invention is depicted in FIGS. 15-16. In the still further embodiment of the present invention depicted in FIG. 15, the graphical indicator has a rotary gauge instead of a linear scale as depicted in other embodiments. As indicated previously, the methods and apparatus of the present invention can be applied to graphical indicators having linear scales, rotary scales, circular scales, digital indicators and graphs with two or more axes.

As depicted in FIG. 15, the graphical indicator and control 600 has a rotary scale 610 and gradations 612. The pointer 620 is operating in manual mode and is therefore de-coupled from advisor pointer 630. Similar to other embodiments, when the graphical indicator and control 600 is in manual mode, the pointer can be grasped by a user with a cursor and set to a desired value. The computer system then makes changes to the one or more settings of the computer system resource to conform to the change made by the user.

In FIG. 16 the user has switched to automated mode by selecting check box 650. Upon selection of the automation-setting check box the pointer 620 couples with the automated advisor pointer 630. The system accordingly then adopts the value indicated by the advisor pointer "11", which in the example dynamically sets the maximum number of servers in the cluster to be 11, based on the current advice from the system.

Figure 17:
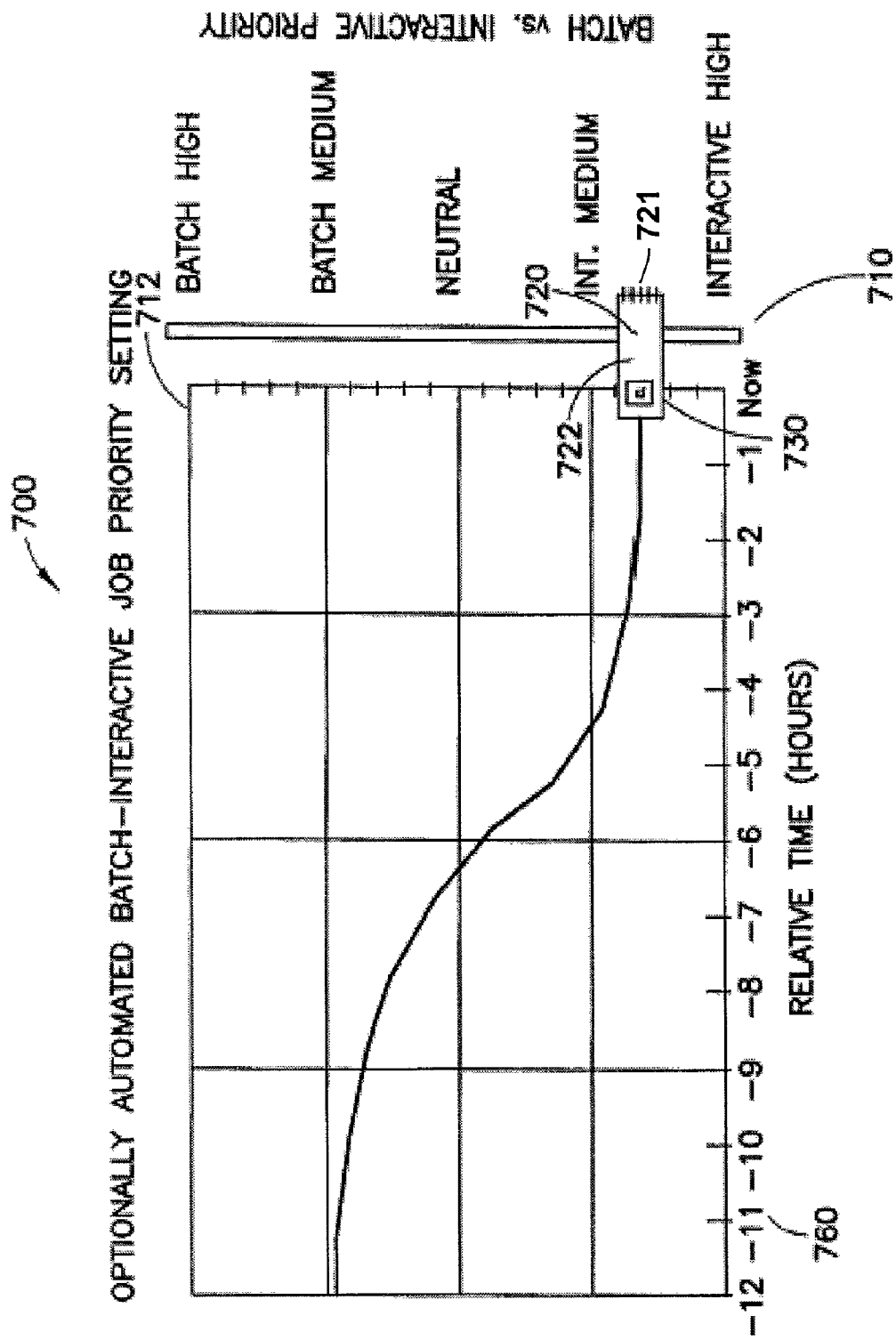
FIG. 17 depicts a two-dimensional graph having a time-line trace indicator coupled to an automated system advisor on one axis of the graph, all operating in accordance with another embodiment of the present invention.

Another embodiment of the present invention is depicted in FIG. 17. As is apparent, the teachings of the present invention can be applied to graphical indicators having two or more axes. In the embodiment depicted in FIG. 17, the two-dimensional graph 700 indicates both a relative time (on the x-axis coinciding with scale 760) and a setting for a computer system resource (on the y-axis coinciding with scale 710). Values are indicated along scale 710 by gradations 712. The manual control has been disengaged as is apparent from the position of the automation-setting control tab 722 of the pointer 720 which has swung about the hinge 721 to couple with the advisor pointer 730. The range limiter aspect of the present invention also can be applied to graphs that have two or more axes.

Figure 18:
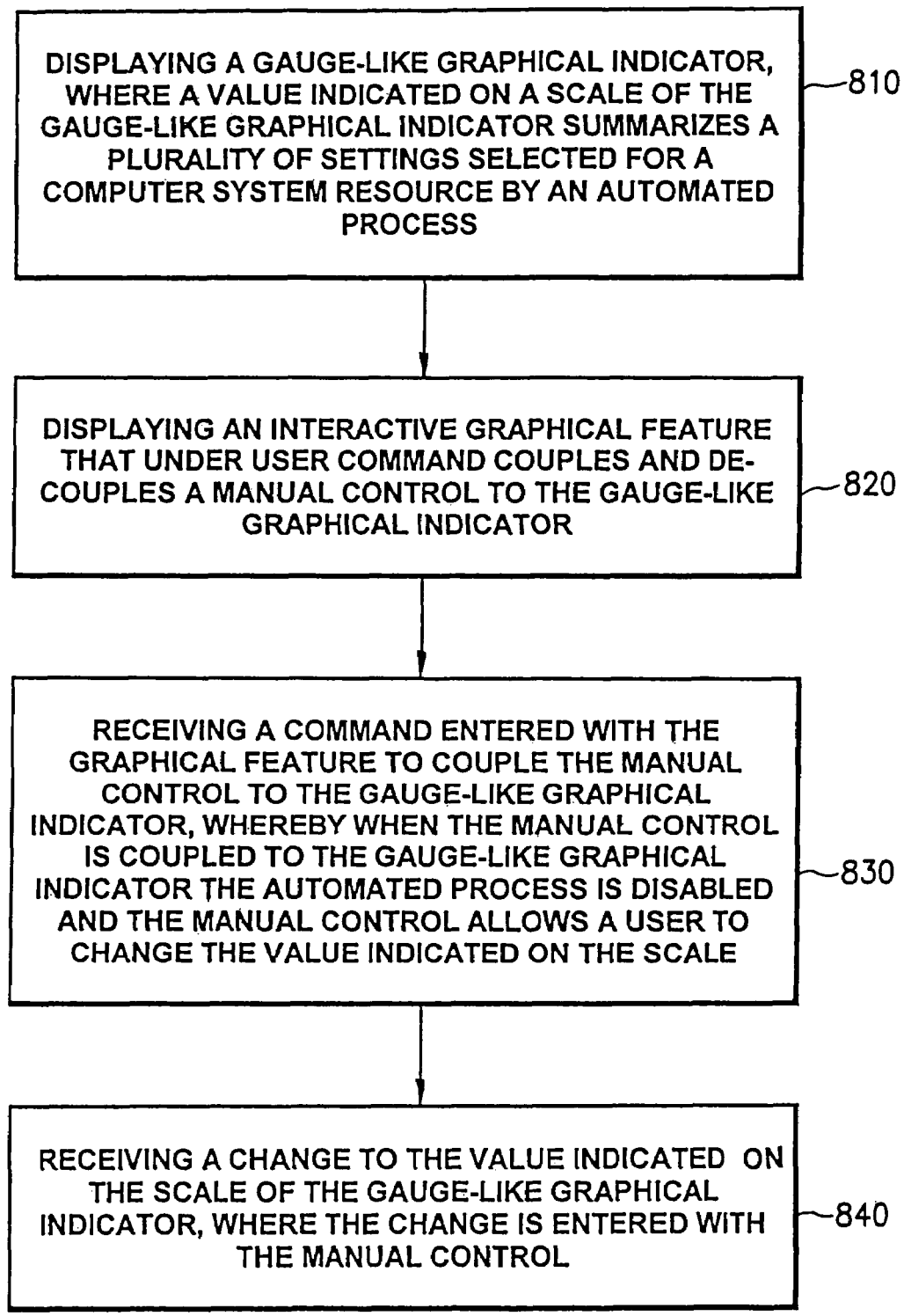
FIG. 18 is a flowchart depicting a method operating in accordance with the present invention.

A method operating in accordance with various embodiments of the present invention is depicted in FIG. 18. At step 810 a graphical indicator and control is displayed on a display device 505B of a computer system. A value indicated on a scale 110 of the graphical indicator and control 100 by a pointer 120 summarizes a plurality of settings selected for a computer system resource by an automated process of the computer system. In other methods, the value indicated on scale 110 may correspond to a value selected for a single parameter of a computer system resource by an automated process.

At step 820, an interactive graphical feature is displayed. Under user command, the interactive graphical feature couples and de-couples an advisor pointer 130 under automated control to the pointer 120 of the graphical indicator and control 100. When the advisor pointer 130 is de-coupled from the pointer 120, an inline manual control is engaged, allowing a user to set the value indicated by the pointer.

Then, at step 830, the computer system receives a command entered with the graphical feature to de-couple the advisor pointer 130 from the pointer 120 thereby disengaging the automated process and enabling an inline manual control. After step 830 is executed, the user can change the value indicated on the scale 110 of the graphical indicator and control 100 using pointer 120.

Next, at step 840, the computer system receives a change made to the value indicated on the scale 110 by pointer 120 through user interaction with the pointer 120 when the graphical indicator and control is in manual mode. Upon receiving a change to the value indicated on the scale 110 of the graphical indicator and 120, the processor 501 makes changes to the plurality of settings of the computer system resource according to programming. This programming typically selects an optimal combination of settings corresponding to the value indicated on the scale.

In further steps of the method of the present invention, the user can re-couple the advisor pointer 130 to the pointer of the graphical indicator and control 100, thereby returning control over the selection of computer system resource settings to the automated process.

In variants of the method depicted in FIG. 18, hybrid control modes can be implemented. In such variants, when a user couples a tolerance control to the system advisor the user can retain a measure of control over the operations of the automated process through the tolerance control. For example, when the tolerance control is implemented as a range limiter 240 like that depicted and described in conjunction with FIG. 7, the user can exercise a measure of control over the operations of the automated process by changing the dimensions of the range limiter as depicted in FIGS. 11A-C. The automated process continues to operate and to select values for the plurality of settings of the computer system resource, but within a range specified by the user.

Thus it is seen that the foregoing description has provided by way of exemplary and non-limiting examples a full and informative description of the best methods and apparatus presently contemplated by the inventors for implementing manual and hybrid control modes in automated graphical indicators and controls. One skilled in the art will appreciate that the various embodiments described herein can be practiced individually; in combination with one or more other embodiments described herein; or in combination with graphical advisors differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A computer system for displaying an interactive graphical user interface on a display device of a computer system, the computer system comprising:

at least one memory to store at least one program of machine-readable instructions, where the at least one program performs operations to display the interactive graphical user interface when executed;

at least one processor coupled to the at least one memory, where the at least one processor performs at least the following operations when the at least one program is executed:

displaying a graphical indicator and control comprising a scale, where a value indicated on the scale corresponds to a setting selected for at least one parameter of a computer system resource by an automated process of the computer system; and displaying an interactive graphical feature that under user command engages and disengages a manual control, wherein when the manual control is engaged the automated process continues to control selection of the setting for the at least one parameter of the computer system resource as represented by the value indicated on the scale of the graphical indicator and control, but subject to a user-selectable moderating effect implemented when the manual control is engaged, where the user-selectable moderating effect prevents large-scale changes to the setting selected for the at least one parameter of the computer system resource by the automated process, but allows small-scale changes to the setting selected for the at least one parameter of the computer system resource by the automated process.

2. The computer system of claim 1 where the manual control is initially disengaged and wherein the operations further comprise:

receiving a command engaging the manual control, the command entered with the interactive graphical feature.

3. The computer system of claim 2 wherein the operations further comprise:

receiving a command entered with the manual control altering a range over which large scale changes to the setting selected for the at least one parameter of the computer system resource by the automated process are prevented.

4. The computer system of claim 3 where the command increases the range over which large scale changes to the setting selected for the at least one parameter of the computer system resource by the automated process are prevented.

5. The computer system of claim 3 where the command decreases the range over which large scale changes to the setting selected for the at least one parameter of the computer system resource by the automated process are prevented.

6. The computer system of claim 2 where the operations further comprise:

receiving a command entered with the interactive graphical feature to disengage the manual control, wherein when the manual control is disengaged the automated process reassumes complete control over the selection of the setting of the at least one parameter of the computer system resource.

7. The computer system of claim 1 where the manual control comprises a graphical band overlaying the scale of the graphical indicator and control, where the graphical band indicates a range over which small-scale changes to the setting selected for the at least one parameter of the computer system resource by the automated process as represented by the value indicated on the scale are allowed as falling within the range of the graphical band, but large-scale changes are not allowed as falling outside the range of the graphical band.

8. The computer system of claim 1 where the at least one memory comprises memory means to store at least one program of machine-readable instructions, and where the at least one processor comprises processor means coupled to the memory means.

9. A graphical user interface control system method comprising:

displaying a graphical indicator and control comprising at least in part a scale on a display device of a computer system, where a value indicated on the scale corresponds to a setting selected for at least one parameter of a computer system resource by an automated process of the computer system; and displaying an interactive graphical feature that under user command engages and disengages a manual control, wherein when the manual control is engaged the automated process continues to control selection of the setting for the at least one parameter of the computer system resource as represented by the value indicated on the scale of the graphical indicator and control, but subject to a user-selectable moderating effect implemented when the manual control is engaged, where the user-selectable moderating effect comprises a user-selectable offset to the value selected for the at least one parameter of the computer system resource by the automated process.

10. The graphical user interface control system method of claim 9 where the manual control is initially disengaged and where the method further comprises:

receiving a command engaging the manual control, the command entered with the interactive graphical feature.

11. The graphical user interface control system method of claim 10 where the method further comprises:

receiving a command entered with the manual control altering the user-selectable offset.

12. The graphical user interface control system method of claim 11 where the command increases the user-selectable offset.

13. The graphical user interface control system method of claim 11 where the command decreases the user-selectable offset.

14. The graphical user interface control system method of claim 11 where the operations further comprise:

receiving a command entered with the interactive graphical feature to disengage the manual control, wherein when the manual control is disengaged the automated process reassumes complete control over the selection of the setting of the at least one parameter of the computer system resource.

* * * * *